United States Patent
Séguin (10) Patent No.: US 12,240,207 B2
(45) Date of Patent: Mar. 4, 2025

(54) FLOOR PLANKS WITH A CORE COMPRISING CALCIUM CARBONATE AND METHODS OF MANUFACTURING THEREOF

(71) Applicant: I4F Licensing NV, Turnhout (BE)

(72) Inventor: Daniel Séguin, Sainte-Marthe-sur-le-Lac (CA)

(73) Assignee: i4F Licensing NV, Turnhout (BE)

( * ) Notice: Subject to any disclaimer, the term of this patent is extended or adjusted under 35 U.S.C. 154(b) by 1041 days.

(21) Appl. No.: 16/964,668

(22) PCT Filed: Jan. 25, 2019

(86) PCT No.: PCT/EP2019/051910
§ 371 (c)(1),
(2) Date: Jul. 24, 2020

(87) PCT Pub. No.: WO2019/145511
PCT Pub. Date: Aug. 1, 2019

(65) Prior Publication Data
US 2020/0347616 A1   Nov. 5, 2020

Related U.S. Application Data

(60) Provisional application No. 62/622,416, filed on Jan. 26, 2018, provisional application No. 62/742,967, filed on Oct. 9, 2018.

(51) Int. Cl.
*B32B 21/14* (2006.01)
*B32B 3/06* (2006.01)
*B32B 21/04* (2006.01)
*E04F 15/02* (2006.01)
*E04F 15/10* (2006.01)

(52) U.S. Cl.
CPC ............. *B32B 21/14* (2013.01); *B32B 3/06* (2013.01); *B32B 21/042* (2013.01); *E04F 15/02038* (2013.01); *E04F 15/107* (2013.01); *B32B 2250/03* (2013.01); *B32B 2471/00* (2013.01); *E04F 2201/0115* (2013.01)

(58) Field of Classification Search
None
See application file for complete search history.

(56) References Cited

U.S. PATENT DOCUMENTS

| 4,471,012 A | 9/1984 | Maxwell |
| 2004/0226243 A1 | 11/2004 | Lin et al. |
| 2010/0105833 A1* | 4/2010 | Keller ............. C09D 175/04 560/336 |
| 2013/0266759 A1 | 10/2013 | Kim et al. |
| 2015/0072102 A1 | 3/2015 | Dossche et al. |

(Continued)

FOREIGN PATENT DOCUMENTS

| JP | S61257566 A | 11/1986 |
| JP | H6146552 A | 5/1994 |

(Continued)

*Primary Examiner* — Chinessa T. Golden
(74) *Attorney, Agent, or Firm* — The Webb Law Firm (57) ABSTRACT

Flooring planks with a core that comprises calcium carbonate. Such planks can also comprise a veneer. The core can also comprise further components such as a resin. Methods of manufacturing same are also disclosed. For example, such flooring planks can be waterproof and/or resistant to moisture and/or heat.

15 Claims, 5 Drawing Sheets

(56) References Cited

U.S. PATENT DOCUMENTS

| | | | |
|---|---|---|---|
| 2015/0290968 A1 | 10/2015 | Hannig | |
| 2017/0165936 A1* | 6/2017 | Schulte | E04F 15/042 |
| 2017/0217133 A1 | 8/2017 | Jordan et al. | |
| 2018/0215972 A1* | 8/2018 | Yang | B32B 21/14 |

FOREIGN PATENT DOCUMENTS

| | | | | |
|---|---|---|---|---|
| JP | H8254003 A | | 10/1996 | |
| JP | 2001355330 A | | 12/2001 | |
| JP | 2003334806 A | | 11/2003 | |
| JP | 2007146387 A | | 6/2007 | |
| JP | 2014504341 A | | 2/2014 | |
| WO | WO-03084746 A1 | * | 10/2003 | B32B 21/08 |
| WO | 2011085306 A1 | | 7/2011 | |

\* cited by examiner

ND METHODS OF MANUFACTURING
FLOOR PLANKS WITH A CORE COMPRISING CALCIUM CARBONATE AND METHODS OF MANUFACTURING THEREOF

CROSS-REFERENCE TO RELATED APPLICATIONS

This application is the United States national phase of International Application No. PCT/EP2019/051910 filed Jan. 25, 2019, and claims priority to U.S. Provisional Patent Application Nos. 62/622,416 filed Jan. 26, 2018 and 62/742,967 filed Oct. 9, 2018, the disclosures of which are hereby incorporated by reference in their entirety.

FIELD OF THE DISCLOSURE

The present disclosure relates to flooring planks and methods of making same. In particular, it relates to flooring planks comprising a core that comprises calcium carbonate.

BACKGROUND OF THE DISCLOSURE

There are lots of requests in the market for easy-to-install waterproof hardwood floors.

However, wood is an organic hygroscopic compound which needs to be protected from heat, humidity and water.

For example, wood and wood-based materials are susceptible to both structural and cosmetic damage from heat, water, fungal decay and mold.

For its various uses, wood must be protected from attack by insects, fungi and other organisms. Insects, such as termites, beetles and carpenter ants may cause extensive and costly damage to wood structures. If left unprotected or unpreserved, the wood will decay and deteriorate within a period of a few months to a few years, depending upon climate and soil conditions.

For example, one concern with commercially available flooring plank is the water and moisture resistance of the finished product and the sensitivity of the raw wood material to heat, water and moisture after the installation process.

For example, excessive moisture can cause edge peaking of the flooring plank due to swelling and such edge peaking can result in edge chip-off or premature wear-out of the plank.

For example, the susceptibility to moisture content discourages people from installing wood flooring planks in areas which are subject to having water on the surface of the floor, such as in the kitchen and bathroom areas.

To prevent those effects, we need to protect the wood to ensure it can be installed in any area and build a product to overcome all situations described above and other inconveniences.

For example, if the wood plank doesn't react to heat and water it will be possible to install it with a glueless system that will simplify and reduce the cost of the installation of the product.

SUMMARY OF THE DISCLOSURE

According to an aspect, the present disclosure relates to a flooring plank including a core comprising a core comprising at least 50 wt. % of calcium carbonate by weight; a first wood veneer having a first grain direction and being affixed to one surface of the core; and a second wood veneer having a second grain direction and being affixed on top of the first wood veneer.

According to another aspect, the present disclosure relates to a flooring plank comprising a core comprising at least 50 wt. % of calcium carbonate by weight; and at least one wood veneer affixed on one surface of the core, said at least one veneer comprising about 55 to about 90% of a veneer resin by weight based on the total weight of the veneer.

According to another aspect, the present disclosure relates to a flooring plank comprising a core comprising at least 50 wt. % of calcium carbonate by weight; at least one wood veneer affixed on one surface of the core; and a veneer resin, said plank comprising about 55 to about 90% of a veneer resin by weight based on the total weight of the plank.

According to another aspect, the present disclosure relates to a flooring plank comprising a core comprising at least 50 wt. % of calcium carbonate by weight based on the total weight of the core and at least 10 wt. % of a core resin by weight based on the total weight of the core, said core having a density of at least 1000 kg/m³; and at least one wood veneer affixed on one surface of the core.

According to another aspect, the present disclosure relates to a method of making a plank, comprising: processing a composition comprising calcium carbonate and a core resin into a shape of a core; affixing at least one wood veneer having a first grain direction to at least one surface of the core; and affixing a second wood veneer having a second grain direction on top of the at least one wood veneer.

According to another aspect, the present disclosure relates to a method of making a plank, comprising: affixing at least one wood veneer having a first grain direction to at least one surface of a core comprising calcium carbonate and a core resin; and affixing a second wood veneer having a second grain direction on top of the at least one wood veneer.

According to another aspect, the present disclosure relates to a method of making a plank, comprising: applying a veneer resin on a surface of a core comprising calcium carbonate and a core resin; contacting a first surface of at least one wood veneer with said veneer resin to affix said at least one wood veneer to said core and to impregnate said at least one wood veneer with said veneer resin for a period of time of about 30 to about 90 min/mm of veneer thickness.

According to another aspect, the present disclosure relates to a method of making a plank, comprising: applying a veneer resin on a surface of a core comprising calcium carbonate and a core resin; contacting a first surface of at least one wood veneer with said veneer resin to affix said at least one wood veneer to said core and to impregnate said at least one wood veneer with said veneer resin for a period of time of about 30 to about 90 min/mm of veneer thickness; applying said veneer resin on a second surface of said at least one veneer;

contacting a first surface of a second wood veneer with said veneer resin on said second surface of said at least one wood veneer to affix said second wood veneer to said at least one veneer and to impregnate said second wood veneer with said veneer resin for a period of time of about 30 to about 90 min/mm of veneer thickness.

According to another aspect, the present disclosure relates to a flooring plank including a core, wherein the core comprises at least 50 wt. % of calcium carbonate by weight.

According to another aspect, the present disclosure relates to a flooring plank comprising: a core comprising at least 50 wt. % calcium carbonate; and a wood veneer applied on one surface of the core.

According to another aspect, the present disclosure relates to a flooring plank comprising: a core comprising at least 50 wt. % calcium carbonate; a first wood veneer, wherein the first wood veneer is affixed to one surface of the core; and a second wood veneer, wherein the second wood veneer is affixed on top of the first wood veneer.

According to another aspect, the present disclosure relates to a method of making a plank, comprising: processing a composition comprising calcium carbonate and a core resin into a shape of a core; and affixing at least one wood veneer to at least one surface of the core.

BRIEF DESCRIPTION OF THE DRAWINGS

In the following drawings, which represent by way of example only, various embodiments of the disclosure.

DETAILED DESCRIPTION OF THE DISCLOSURE

Further features and advantages will become more readily apparent from the following description of various embodiments as illustrated by way of non-limiting examples.

The terms "an embodiment", "embodiment", "embodiments", "the embodiment", "the embodiments", "one or more embodiments", "some embodiments", and "one embodiment" mean "one or more (but not all) embodiments of the present invention(s)", unless expressly specified otherwise.

Finally, terms of degree such as "substantially", "about" and "approximately" as used herein mean a reasonable amount of deviation of the modified term such that the end result is not significantly changed. These terms of degree should be construed as including a deviation of at least ±10% of the modified term if this deviation would not negate the meaning of the word it modifies.

The terms "including", "comprising" and variations thereof mean "including but not limited to", unless expressly specified otherwise. A listing of items does not imply that any or all of the items are mutually exclusive, unless expressly specified otherwise. The terms "a", "an" and "the" mean "one or more", unless expressly specified otherwise.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

For example, the flooring plank further includes at least one wood veneer, the wood veneer being affixed on one surface of the core.

For example, the first grain direction and the second grain direction of the flooring plank are substantially orthogonal with respect to one another.

For example, the flooring plank has a swelling rate of less than about 0.5%/0.1 mm of thickness of wood veneer, measured according to EN 13329.

For example, the flooring plank has a swelling rate of less than about 0.4%/0.1 mm of thickness of wood veneer, measured according to EN 13329.

For example, the flooring plank has a swelling rate of less than about 0.3%/0.1 mm of thickness of wood veneer, measured according to EN 13329.

For example, the flooring plank has a swelling rate of less than about 0.2%/0.1 mm of thickness of wood veneer, measured according to EN 13329.

For example, the flooring plank has a swelling rate of less than about 0.1%/0.1 mm of thickness of wood veneer, measured according to EN 13329.

For example, the flooring plank has a swelling rate of less than about 0.5%/0.1 mm to about 0.01%/0.1 mm of thickness of wood veneer, measured according to EN 13329.

For example, the flooring plank has a swelling rate of less than about 0.2%/0.1 mm to about 0.02%/0.1 mm of thickness of wood veneer, measured according to EN 13329.

For example, the flooring plank has a swelling rate of less than about 0.1%/0.1 mm to about 0.01%/0.1 mm of thickness of wood veneer, measured according to EN 13329.

For example, the at least one veneer comprises about 55 to about 95% of a veneer resin by weight based on the total weight of the veneer.

For example, the at least one veneer comprises about 60 to about 85% of a veneer resin by weight based on the total weight of the veneer.

For example, the at least one veneer comprises about 65 to about 80% of a veneer resin by weight based on the total weight of the veneer.

For example, the at least one veneer comprises about 70 to about 80% of a veneer resin by weight based on the total weight of the veneer.

For example, the flooring plank comprises about 55 to about 90% of a veneer resin by weight based on the total weight of the plank.

For example, the flooring plank comprises about 60 to about 85% of a veneer resin by weight based on the total weight of the plank.

For example, the flooring plank comprises about 65 to about 85% of a veneer resin by weight based on the total weight of the plank.

For example, the flooring plank comprises about 70% to about 80% of a veneer resin by weight based on the total weight of the plank.

For example, the flooring plank further comprises at least one wood veneer, the at least one wood veneer being affixed on one surface of the core.

For example, a varnish is applied to the wood veneer, so that the wood veneer is sandwiched between the core and the varnish.

For example, the flooring plank further includes a first wood veneer, wherein the first wood veneer is affixed to one surface of the core; and a second wood veneer, wherein the second wood veneer is affixed on top of the first wood veneer.

For example, the varnish comprises a non-toxic hypoallergenic material.

For example, the varnish comprises isocyanate.

For example, the first wood veneer and the second wood veneer are substantially of the same species and thickness, such that the first wood veneer and the second wood veneer form a cross link to stabilize the warping of the flooring plank.

For example, a varnish is applied to the second wood veneer.

For example, at least one wood veneer has a thickness of about 0.2 mm to about 7 mm.

For example, at least one wood veneer has a thickness of about 0.5 mm to about 4 mm.

For example, the at least one wood veneer has a thickness of about 1 mm to about 3 mm.

For example, the at least one wood veneer has a thickness of about 0.5 mm to about 1 mm.

For example, the at least one wood veneer is affixed to the one surface of the core with a bonding material.

For example, at least one wood veneer is affixed to the one surface of the core with a resin comprising polyurethane.

For example, the core defines a tongue and groove locking mechanism.

For example, the core defines an elongated groove on at least one edge of the core and at least one elongated tongue on at least one other edge of the core.

For example, the core defines a click-lock locking mechanism.

For example, the core defines a click-lock glueless system on each edge of the core.

For example, a thickness of the core is about 1 mm to 30 mm.

For example, a thickness of the core is about 1 mm to 15 mm.

For example, a thickness of the core is about 1 mm to about 12 mm.

For example, a thickness of the core is about 2 mm to about 10 mm.

For example, a thickness of the core is about 3 mm to 8 mm.

For example, a thickness of the core is about 2 mm.

For example, a thickness of the core is about 3 mm.

For example, a thickness of the core is about 6 mm.

For example, a thickness of the core is about 8 mm.

For example, the core has a density of at least 1000 $kg/m^3$.

For example, the core has a density of about 1000 $kg/m^3$ to about 2600 $kg/m^3$.

For example, the core has a density of at least 1500 $kg/m^3$.

For example, the core has a density of at least 1800 $kg/m^3$.

For example, the core has a density of about 1800 $kg/m^3$.

For example, the core has a density of about 1500 $kg/m^3$ to about 2100 $kg/m^3$.

For example, the core comprises at least 55 wt. % of calcium carbonate.

For example, the core comprises at least 60 wt. % of calcium carbonate.

For example, the core comprises at least 65 wt. % of calcium carbonate.

For example, the core comprises at least 70 wt. % of calcium carbonate.

For example, the core comprises at least 75 wt. % of calcium carbonate.

For example, the core comprises about 50 wt. % to about 90 wt. % of calcium carbonate.

For example, the core comprises about 60 wt. % to about 80 wt. % of calcium carbonate.

For example, the core comprises about 65 wt. % to about 75 wt. % of calcium carbonate.

For example, the core comprises about 68 wt. % to about 72 wt. % of calcium carbonate.

For example, the core comprises about 10 wt. % to about 40 wt. % of a core resin.

For example, the core comprises about 15 wt. % to about 35 wt. % of a core resin.

For example, the core comprises about 20 wt. % to about 30 wt. % of a core resin.

For example, the core comprises about 22 wt. % to about 28 wt. % of a core resin.

For example, the core comprises about 23 wt. % to about 27 wt. % of a core resin.

For example, the core resin comprises polyethylene (PE), polypropylene (PP), high-density polyethylene (HDPE), low-density polyethylene (LDPE), polyethylene terephthalate (PET) and/or polyvinylchloride (PVC).

For example, the core resin comprises polyvinylchloride (PVC).

For example, the core resin further comprises at least one of: color powder; chlorinated polyethylene; polyethylene; and calcium stearate.

For example, the core comprises about 65 wt. % to about 75 wt. % calcium carbonate and about 20 wt. % to about 30 wt. % of resin.

For example, the core comprises about 70 wt. % calcium carbonate and about 25 wt. % PVC resin.

For example, the core comprises about 0.1 wt. % to about 1.0 wt. % of color powder, about 1 wt. % to about 2 wt. % of chlorinated polyethylene, about 1 wt. to about 2 wt. % polyethylene and about 0.1 wt. % to about 1.0 wt. % of calcium stearate.

For example, the core comprises about 0.5 wt. % color powder, about 1.3 wt % chlorinated polyethylene, about 1.5 wt. % polyethylene and about 0.6 wt. % calcium stearate.

For example, the core is a panel of at least 1200 mm by at least 1200 mm.

For example, the core is an extruded panel of about 1230 mm by about 1280 mm.

For example, the core is an extruded panel of about 1200 mm by about 1200 mm.

For example, the core is an extruded panel of about 209 mm by about 1230 mm.

For example, the plank is waterproof.

For example, the plank is resistant to moisture and/or heat.

For example, the method of making a plank comprises: processing a composition comprising calcium carbonate and a resin into a shape of a core; and affixing at least one wood veneer to at least one surface of the core.

For example, the said at least one veneer wood veneer and said second wood veneer are affixed in such a manner that said first grain direction and said second grain direction are substantially orthogonal with respect to one another.

For example, the processing comprises extruding the core.

For example, said veneer resin is applied with a roller coater.

For example, the processing further comprises pressing said plank at temperature of about 40° C. to about 100° C. For example, the processing further comprises pressing said plank at temperature of about 50° C. to about 80° C.

For example, the processing further comprises pressing said plank at temperature of about 60° C. to about 70° C.

For example, said plank is pressed for a period of time of about 20 to about 60 min.

For example, said plank is pressed for a period of time of about 30 to about 50 min.

For example, said veneer resin is applied on said surface of said core in an amount of about 80 g to about 160 g/m2.

For example, said veneer resin is applied on said surface of said core in an amount of about 100 g to about 140 g/m2.

For example, said veneer resin is applied on said surface of said core in an amount of about 110 g to about 130 g/m2.

For example, said veneer resin is applied on said second surface of said at least one veneer in an amount of about 40 g to about 80 g/m2.

For example, said veneer resin is applied on said second surface of said at least one veneer in an amount of about 45 g to about 75 g/m2.

For example, said veneer resin is applied on said second surface of said at least one veneer in an amount of about 50 g to about 70 g/m2.

For example, said veneer resin is applied on said second surface of said at least one veneer in an amount of about 50 g to about 60 g/m2.

For example, a thickness of the core is about 1 mm to about 12 mm.

For example, the affixing comprises: affixing a first wood veneer having a first grain direction to one surface of the core; and affixing a second veneer having a second grain direction on top of the first wood veneer.

For example, the method further comprises: applying a first resin layer between the one surface of the core and the first wood veneer to affix the first wood veneer to the core; and applying a second resin layer between the first wood veneer and the second wood veneer to affix the second wood veneer to the first wood veneer, such that the first wood veneer and the second wood veneer form a cross link to stabilize the warping of the flooring plank.

For example, at least one of the first resin layer and the second resin layer comprise polyurethane.

For example, the method further comprises at least one of: trimming the plank; cutting the plank; profiling the plank; sanding the plank; and varnishing the plank with a varnish.

For example, the method comprises profiling a locking mechanism on at least one edge of the plank.

For example, the method comprises profiling a locking mechanism on each edge of the plank.

For example, the profiling comprises profiling an elongated groove on one edge of the core and/or an elongated tongue on one other edge of the core.

For example, the profiling comprises profiling a click-lock system on each edge of the core.

For example, the profiling comprises profiling a click-lock glueless system on each edge of the core.

For example, the method further comprises cutting the plank before profiling the plank.

For example, the varnish comprises a non-toxic hypoallergenic material.

For example, the varnish comprises isocyanate.

For example, the varnish comprises at least one anti-yellowing UV inhibiter.

Figure 1A:
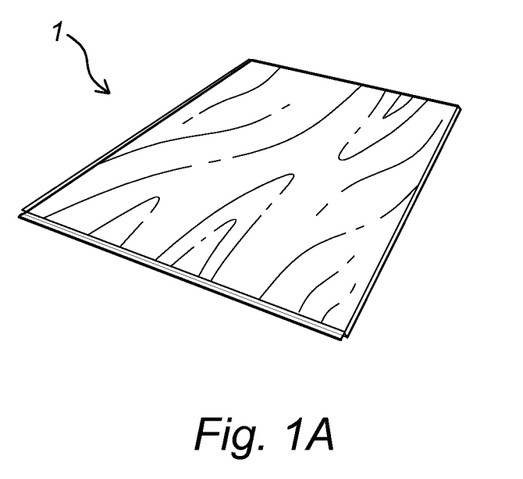
FIG. 1A shows a schematic illustration of an example embodiment of a flooring plank in accordance with at least one embodiment.

Referring to FIG. 1A, there is shown a schematic illustration of a flooring plank 1. In FIG. 1A, the flooring plank 1 is shown in the form of a panel of 1280 mm×1230 mm.

Figure 1B:
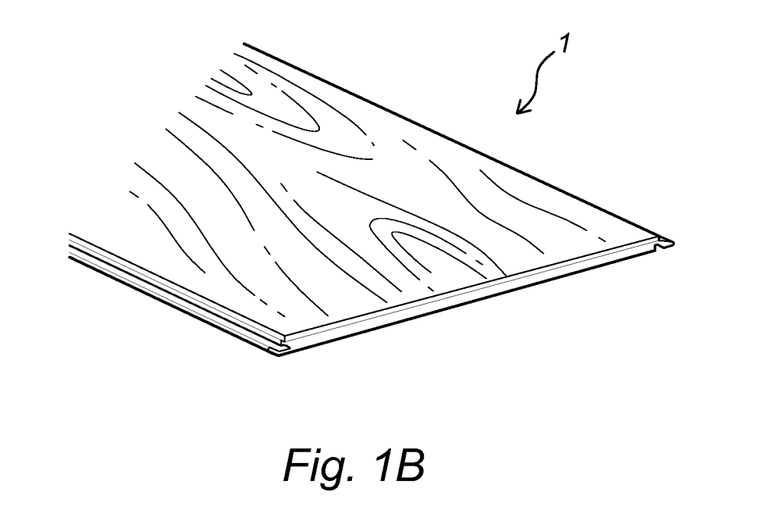
FIG. 1B shows a schematic illustration of the flooring plank of FIG. 1A.

Referring to FIG. 1B, there is shown another view of the flooring plank 1 of FIG. 1A. The flooring plank includes a core. The core comprises calcium carbonate.

For example, a thickness of the core is about 1 mm to about 12 mm.

For example, a thickness of the core is about 2 mm to about 10 mm.

For example, a thickness of the core is about 3 mm to 8 mm.

For example, a thickness of the core is about 2 mm.

For example, a thickness of the core is about 3 mm.

For example, a thickness of the core is about 6 mm.

For example, a thickness of the core is about 8 mm.

For example, the core has a density of at least 1800 kg/m$^3$.

For example, the core has a density of about 1000 kg/m$^3$ to about 2600 kg/m$^3$.

For example, the core has a density of at least 1500 kg/m$^3$.

For example, the core has a density of about 1500 kg/m$^3$ to about 2100 kg/m$^3$.

For example, the core comprises at least 55 wt. % of calcium carbonate.

For example, the core comprises at least 60 wt. % of calcium carbonate.

For example, the core comprises at least 65 wt. % of calcium carbonate.

For example, the core comprises at least 70 wt. % of calcium carbonate.

For example, the core comprises at least 75 wt. % of calcium carbonate.

For example, the core comprises about 50 wt. % to about 90 wt. % of calcium carbonate.

For example, the core comprises about 60 wt. % to about 80 wt. % of calcium carbonate.

For example, the core comprises about 65 wt. % to about 75 wt. % of calcium carbonate.

For example, the core comprises about 68 wt. % to about 72 wt. % of calcium carbonate.

For example, the core comprises about 10 wt. % to about 40 wt. % of a core resin.

For example, the core comprises about 15 wt. % to about 35 wt. % of a core resin.

For example, the core comprises about 20 wt. % to about 30 wt. % of a core resin.

For example, the core comprises about 22 wt. % to about 28 wt. % of a core resin.

For example, the core comprises about 23 wt. % to about 27 wt. % of a core resin.

For example, the core resin comprises polyvinylchloride (PVC).

For example, the core comprises at least one of: color powder; chlorinated polyethylene; polyethylene; and calcium stearate.

For example, the core comprises about 70 wt. % calcium carbonate and about 25 wt. % PVC core resin.

For example, the core comprises about 70 wt. % calcium carbonate and about 25 wt. % PVC core resin.

For example, the core comprises about 0.1 wt. % to about 1.0 wt. % of color powder, about 1 wt. % to about 2 wt. % of chlorinated polyethylene, about 1 wt. to about 2 wt. % polyethylene and about 0.1 wt. % to about 1.0 wt. % of calcium stearate.

For example, the core comprises about 0.5 wt. % color powder, about 1.3 wt % chlorinated polyethylene, about 1.5 wt. % polyethylene and about 0.6 wt. % calcium stearate.

For example, the core can be composed of about 70% calcium carbonate and about 25% PVC core resin.

For example, the core can be composed of about 0.5% color powder, about 1.3% chlorinated polyethylene, about 1.5% polyethylene and about 0.6% calcium stearate.

For example, the core can be stable to variations in humidity (RH 30%-70%).

For example, the core can provide greater strength over time.

For example, the core can be resistant to expansion and/or contraction, such as when atmospheric conditions vary.

For example, the core can be heat resistant.

For example, the core can be waterproof.

For example, the core can be rigid.

For example, the core can be dent resistant.

Figure 2A:
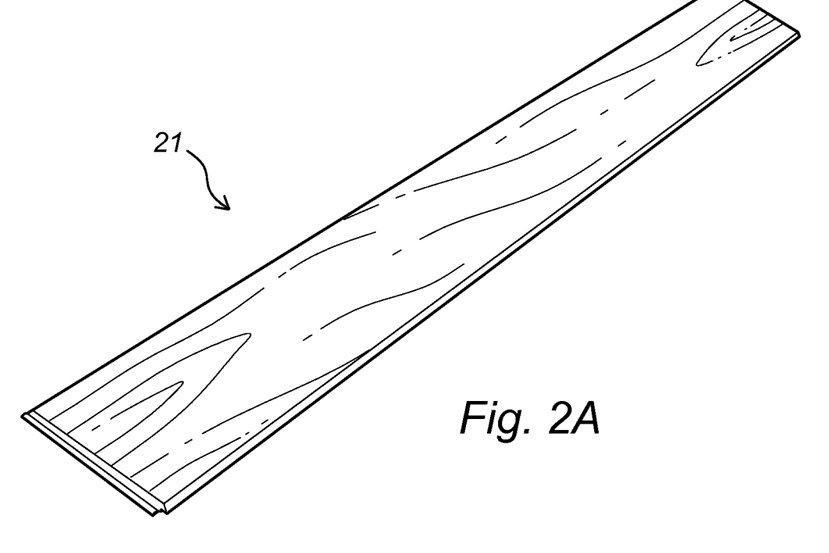
FIG. 2A shows a schematic illustration of an example embodiment of a flooring plank in accordance with at least one embodiment.

Referring to FIG. 2A, there is shown a schematic illustration of a flooring plank 21.

Figure 2B:
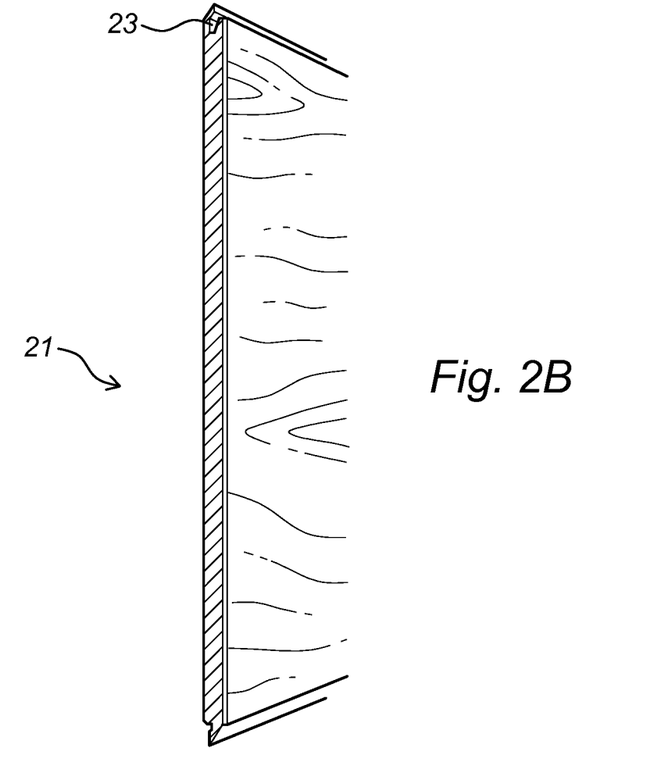
FIG. 2B shows a side view of the flooring plank of FIG. 1A.

Referring to FIG. 2B, there is shown a side view of the flooring plank 21 of FIG. 2A. A mechanical locking system 23 is shown on FIG. 2B. For example, the mechanical locking system 23 can be profiled on the core of the flooring plank 21.

For example, the mechanical locking system can be a click-lock glueless system on each edge of the core.

For example, the mechanical locking system can be a tongue and groove system.

For example, the flooring plank can have a groove extending along a first edge of the first panel and a tongue extending along a second edge of the first panel.

For example, the tongue can be on an opposing side of the edge of the panel having the groove.

For example, the groove has a groove profile and the tongue has a tongue profile such that the tongue and groove are capable of connecting with other panels having the groove profile and the tongue profile.

For example, the groove of a first panel is insertable into the tongue of a second panel while the second panel is lying flat on a surface to form a mechanical lock.

For example, a flooring plank includes a core composed of calcium carbonate and/or other materials as described above. The flooring plank also includes a wood veneer applied on one surface of the core. A varnish can be applied to the wood veneer, so that the wood veneer is sandwiched between the core and the varnish.

For example, the varnish can include a non-toxic hypoallergenic material.

For example, the varnish can include isocyanate.

For example, the wood veneer can have a thickness of about 0.2 mm to about 7 mm.

For example, the wood veneer can have a thickness of about 0.5 mm to about 4 mm.

For example, the wood veneer can have a thickness of about 1 mm to about 3 mm.

For example, the wood veneer can be affixed to the one surface of the core with a bonding material.

For example, the wood veneer can be affixed to the one surface of the core with resin comprising polyurethane.

Figure 3:
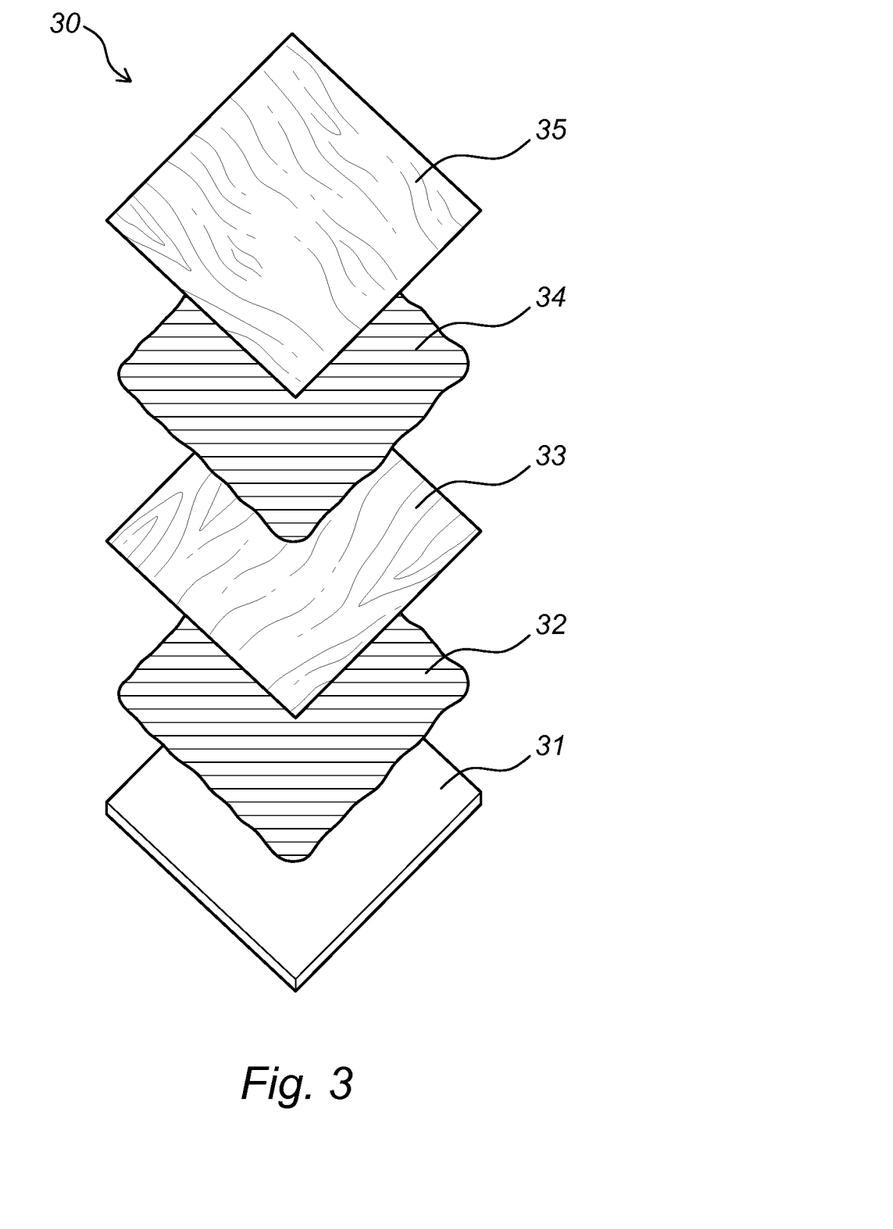
FIG. 3 shows a schematic illustration of an example embodiment of a flooring plank in accordance with at least one embodiment.

Referring to FIG. 3, there is shown a layered view of a flooring plank 30. The flooring plank 30 includes a core 31 composed of calcium carbonate and/or other materials as described above, a first wood veneer 33 and a second wood veneer 35. The first wood veneer is affixed to the surface of the core by a layer of resin 32. The second wood veneer is affixed on top of the first wood veneer by a layer of resin 34.

For example, the resins 32 and 34 can be of polyurethane resin.

Wood grain refers to the longitudinal orientation of the wood fibers.

For example, as the first wood veneer is affixed to the second wood veneer, the directions of their respective grain may be a factor for stabilizing the warping of the flooring plank.

For example, the first wood veneer can have a first grain direction.

For example, the first grain direction can be horizontal.

For example, the second wood veneer can have a second grain direction.

For example, the second grain direction can be vertical.

For example, the second wood veneer can be at a direction that is at 90 degrees from the first grain direction of the first wood veneer.

For example, the first wood veneer and the second wood veneer can be of the same species and thickness.

For example, by same species, it is understood that the first wood veneer and the second wood veneer can be of oak.

As another example, the first wood veneer and the second wood veneer can be of maple.

For example, the second wood veneer can be affixed on the first wood veneer, such that the first wood veneer and the second wood veneer form a cross link to stabilize the warping of the flooring plank.

For example, when affixing the first wood veneer on the core, there is a tension that is created on the first wood veneer in the direction of the first grain direction.

For example, this tension can force the first wood veneer to take a curve shape when affixed to the core.

For example, this tension can force the first wood veneer to warp.

For example, this tension can force the first wood veneer to warp for about +5 mm in the vertical direction.

For example, this tension can be created because wood can be hygroscopic.

For example, wood tends to absorb moisture from the air.

When affixing the second wood veneer on top of the first wood veneer, a second tension is created by the second wood veneer.

For example, this second tension can be in the direction of the second grain direction.

For example, this second tension can counterbalance the tension created by the first wood veneer.

For example, this second tension can be opposed to the first tension to fold down the warping of the first wood veneer.

For example, assuming the first wood veneer is warped by about +5 mm in the vertical direction, the second tension can be applied to the first wood veneer to fold down the first wood veneer by −5 mm, such the warping of the flooring plank is cancelled.

For example, as such, the first wood veneer and the second wood veneer can form a cross link to stabilize the warping of the flooring plank.

For example, the first wood veneer and the second wood veneer can be two crossed wood veneer plies of the same species and thickness that are applied on an extruded core to stabilize the warping of flooring plank.

For example, a varnish can be applied to the second wood veneer.

For example, once the varnish is applied to the second wood veneer, it seals the second wood veneer.

For example, the varnish can be a sealer.

For example, applying the varnish to the second wood veneer can make the flooring plank water resistant.

For example, applying the varnish to the second wood veneer can make the flooring plank heat resistant.

For example, applying the varnish to the second wood veneer can make the flooring plank moisture resistant.

For example, the varnish can include a non-toxic hypoallergenic material.

For example, the varnish can include isocyanate.

For example, a color or pattern can be applied to the varnish for aesthetic purposes.

Figure 4:
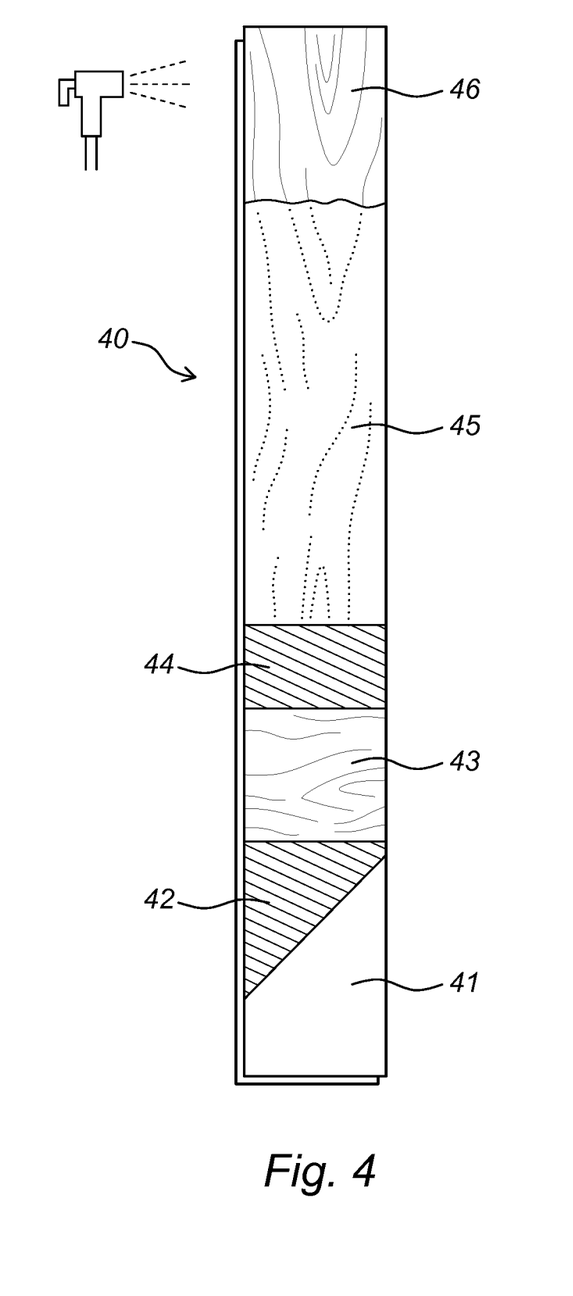
FIG. 4 shows a schematic illustration of an example embodiment of a flooring plank in accordance with at least one embodiment.

Referring to FIG. 4, there is shown a layered view of a flooring plank 40. The flooring plank 40 includes a core 41 composed of calcium carbonate and/or other materials as described above, a first wood veneer 43 and a second wood veneer 45. The first wood veneer is affixed to the surface of the core by a layer of resin 42. The second wood veneer is affixed on top of the first wood veneer by a layer of resin 44.

For example, the resins 42 and 44 can be of polyurethane resin. A varnish 46 can be applied to second wood veneer 45.

For example, the varnish can include comprises a non-toxic hypoallergenic material.

For example, the varnish can include isocyanate.

For example, the varnish can integrate an anti-yellowing UV inhibiter.

For example, the varnish can offer an increased resistance to surface wear.

For example, a flooring plank can include a core composed of at least 70% calcium carbonate; a first wood veneer having a first grain direction, wherein the first wood veneer is affixed to one surface of the core; a second wood veneer having a second grain direction, wherein the second wood veneer is affixed on top of the first wood veneer, such that the first wood veneer and the second wood veneer form a cross link to stabilize the warping of the flooring plank; and a varnish applied to the second veneer.

For example, the varnish can include a non-toxic hypoallergenic material.

For example, the varnish can include isocyanate.

For example, the flooring plank can be waterproof.

For example, the flooring plank can be resistant to moisture and/or heat.

Figure 5:
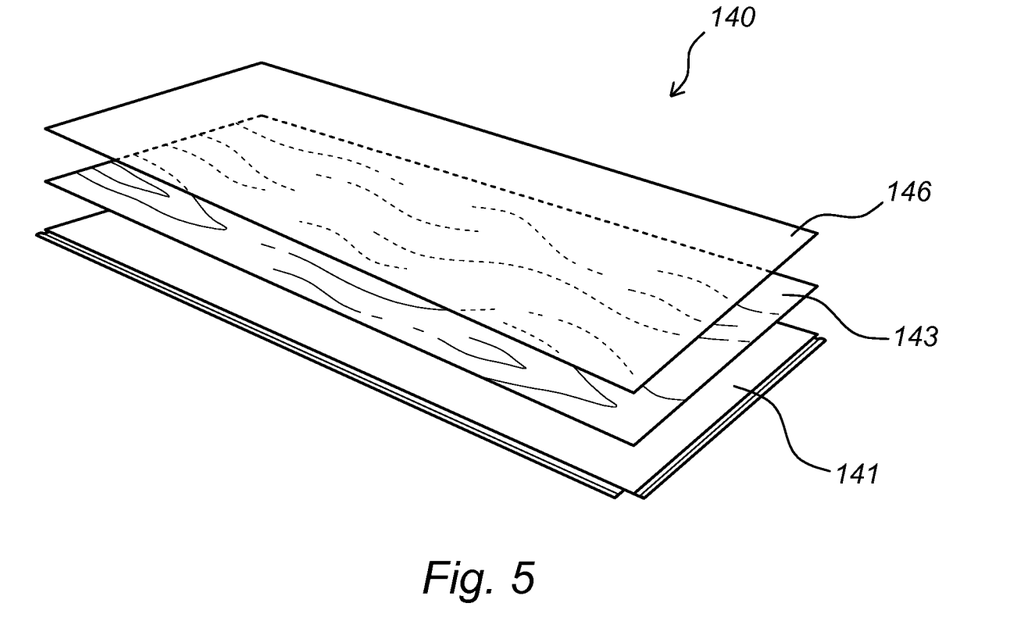
FIG. 5 shows a schematic illustration of an example embodiment of a flooring plank in accordance with at least one embodiment.

Referring to FIG. 5, there is shown a layered view of a flooring plank 140. The flooring plank 140 includes a core 141. The core can comprise calcium carbonate and/or other materials as described above. The flooring plank 140 can also include a wood veneer 143. A varnish layer 146 can be applied to the wood veneer 143.

For example, the core can be stable to variations in humidity (RH 30%-70%).

For example, the core can provide greater strength over time.

For example, the core can be resistant to expansion and/or contraction, such as when atmospheric conditions vary.

For example, the core can be heat resistant. For example, the core can be waterproof.

For example, the core can be rigid.

For example, the core can be dent resistant.

For example, the wood veneer 143 can be affixed to the surface of the core by a bonding material, such as a layer of resin.

For example, the resin can comprise polyurethane.

For example, the wood veneer can be of multiple colours.

For example, the veneer can be designed with micro-v four-sided bevels.

For example, the veneer can embody the authenticity and craftsmanship of real wood due to the micro-v joints and evenly applied stain.

For example, the wood veneer 143 can include 2 wood veneers which have been affixed together.

For example, the wood veneer 143 can include two crossed wood veneer plies of the same species and thickness.

For example, such configuration can stabilize the warping of the flooring plank.

For example, the varnish 146 can be applied to the wood veneer 143.

For example, the varnish can include comprises a non-toxic hypoallergenic material.

For example, the varnish can include isocyanate.

For example, the varnish can include a non-toxic hypoallergenic finish with antimicrobial agent incorporated.

For example, the varnish can integrate an anti-yellowing UV inhibiter.

For example, the varnish can offer an increased resistance to surface wear.

For example, the varnish can be durable.

For example, the varnish can offer long lasting performance.

A method of making a flooring plank can include: processing a composition into a shape of a core, wherein the core is composed of calcium carbonate; and affixing at least one wood veneer to one surface of the core.

For example, the processing can include extruding the core.

For example, the core can further be composed of PVC core resin; color powder; chlorinated polyethylene; polyethylene; and calcium stearate.

For example, the core can be extruded in a panel of at least 1230 mm×1280 mm.

For example, the affixing can include affixing a first wood veneer having a first grain direction to one surface of the core and affixing a second veneer having a second grain direction on top of the first wood veneer.

The method can further include applying a first resin layer between the one surface of the core and the first wood veneer to affix the first wood veneer to the core; and applying a second resin layer between the first wood veneer and the second wood veneer to affix the second wood veneer to the first wood veneer, such that the first wood veneer and the second wood veneer form a cross link to stabilize the warping of the flooring plank.

For example, the first resin layer and the second resin layer can include polyurethane.

The method can further include: trimming the plank; cutting the plank; profiling the plank; sanding the plank; and varnishing the plank with a varnish.

For example, profiling the flooring plank can include profiling an elongated groove on one edge of the core and an elongated tongue on one other edge of the core.

For example, profiling the flooring plank can include profiling a click-lock design on each edge of the core.

For example, profiling the flooring plank can include profiling a glueless locking mechanism each edge of the core.

For example, the varnish can include a non-toxic hypoallergenic material.

For example, the varnish can include isocyanate.

For example, the flooring plank can be easy to install.

For example, the flooring plank can be installed with drop lock installation.

For example, no resin, nails or stapes may be required to install the flooring plank.

For example, the flooring plank may be used in kitchens, bathrooms and basements.

For example, the flooring plank may be installed over subfloors with minor imperfections.

For example, the present subject matter relates to a method of making a plank that will provide a rigid waterproof hardwood flooring plank that will use a wide variety of wood species on a calcium carbonate composite core.

For example, the core can be of more than 3 mm to 8 mm in thickness.

For example, the core can be water, moisture and heat resistant.

For example, the core will present a density over 1800 kg/m$^3$.

For example, the distinct coloured composite core content presents more than 70% of calcium carbonate extruded in a panel of more than 1230 mm×1280 mm to affix wood veneer on its surface of more than 0.5 mm to 4 mm thick in sheet or coupon.

For example, the veneer resin comprises polyurethane.

For example, the at least one wood veneer has a thickness of about 0.2 mm to about 7 mm.

For example, the at least one wood veneer has a thickness of about 0.5 mm to about 4 mm.

For example, the at least one wood veneer has a thickness of about 1 mm to about 3 mm.

For example, the at least one wood veneer has a thickness of about 0.5 mm to about 1 mm.

For example, the veneer can be impregnated with more than half of its thickness with adapted polyurethane resin based on wood species absorption to be applied with pressure and heat on one surface of the core after it has been extruded.

For example, two crossed wood veneer plies of the same species and thickness can be applied on one face of the extrusion to stabilize the warping of the panel. All components can be assembled to cover the surface of the panel that will be cut in plank, profiled, sanded, brushed, scraped and finally covered by a stained or natural water-based varnish that will incorporate isocyanate and impregnate the other half of the thickness of the veneer ply to increase the water protection.

By its density and rigidity, the plank can be profiled with a regular tongue and groove profile or a click-lock resinless system on each edge.

For example, with this wood treatment on an inert and rigid core, the plank can be resistant to moisture or water absorption.

For example, the plank can be resistant to heat and heat variations.

For example, the plank can be resistant to expansion and/or contraction which would result in peaks or gaps.

For example, said plank has a swelling rate of less than about 0.5%/0.1 mm of thickness of wood veneer, measured according to EN 13329.

For example, said plank has a swelling rate of less than about 0.4%/0.1 mm of thickness of wood veneer, measured according to EN 13329.

For example, said plank has a swelling rate of less than about 0.3%/0.1 mm of thickness of wood veneer, measured according to EN 13329.

For example, said plank has a swelling rate of less than about 0.2%/0.1 mm of thickness of wood veneer, measured according to EN 13329.

For example, said plank has a swelling rate of less than about 0.1%/0.1 mm of thickness of wood veneer, measured according to EN 13329.

While a description was made with particular reference to the specific embodiments, it will be understood that numerous modifications thereto will appear to those skilled in the art. The scope of the claims should not be limited by specific embodiments and examples provided in the present disclosure and accompanying drawings, but should be given the broadest interpretation consistent with the disclosure as a whole.

The invention claimed is:

1. A flooring plank comprising:
   a core comprising at least 50 wt. % of calcium carbonate by weight;
   a first wood veneer having a first grain direction and being affixed to a top surface of the core; and
   a second wood veneer having a second grain direction and being affixed on top of the first wood veneer,
   wherein the first wood veneer is placed between the core and the second wood veneer,
   wherein the first grain direction and the second grain direction are substantially orthogonal with respect to one another, and
   wherein the first wood veneer and the second wood veneer are substantially of a same species and thickness, such that the first wood veneer and the second wood veneer form a cross link to stabilize a warping of the flooring plank.

2. The flooring plank of claim 1, wherein at least one of the first and second wood veneer has a thickness of 0.2 mm to 7 mm.

3. The flooring plank of claim 1, wherein at least one of the first and second wood veneer is affixed to the one surface of the core with a resin comprising polyurethane.

4. The flooring plank of claim 1, wherein the core defines a click-lock locking mechanism.

5. The flooring plank of claim 1, wherein a thickness of the core is 2 mm to 10 mm.

6. The flooring plank of claim 1, wherein the core has a density of 1000 kg/m$^3$ to 2600 kg/m$^3$.

7. The flooring plank of claim 1, wherein the core comprises at least 70 wt. % of calcium carbonate.

8. The flooring plank of claim 1, wherein the core comprises 15 wt. % to 35 wt. % of a core resin.

9. The flooring plank of claim 8, wherein the core resin comprises polyethylene (PE), polypropylene (PP), high-density polyethylene (HDPE), low-density polyethylene (LDPE), polyethylene terephthalate (PET) and/or polyvinyl-chloride (PVC).

10. A flooring plank comprising:
    a core comprising at least 50 wt. % of calcium carbonate by weight;
    a first wood veneer having a first grain direction and being affixed on a top surface of the core, said first wood veneer comprising about 55 to about 90% of a veneer resin by weight based on the total weight of the veneer; and
    a second wood veneer having a second grain direction and being affixed on top of the first wood veneer,
    wherein the first wood veneer is placed between the core and the second wood veneer,
    wherein the first grain direction and the second grain direction are substantially orthogonal with respect to one another, and
    wherein a first waterproof layer is applied between the core and the first wood veneer and a second waterproof layer is applied between the first wood veneer and the second wood veneer.

11. The flooring plank of claim 10, wherein the veneer resin further comprises at least one of: color powder; chlorinated polyethylene; polyethylene; and calcium stearate.

12. A method of making a flooring plank, comprising:
    affixing at least one wood veneer having a first grain direction to a first surface of a core comprising calcium carbonate and a core resin;
    affixing a second wood veneer being of substantially a same species and thickness as the first wood veneer, and having a second grain direction on top of the wood veneer such that the first wood veneer and the second wood veneer form a cross link to stabilize a warping of the flooring plank; and
    wherein the first wood veneer is placed between the core and the second wood veneer, and
    wherein the first wood veneer and the second wood veneer are affixed in such a manner that the first grain direction and the second grain direction are substantially orthogonal with respect to one another.

13. The method of claim 12, wherein veneer resin is applied on said surface of said core in an amount of 80 g/m2 to 160 g/m2.

14. The method of claim 12, wherein veneer resin is applied on said second surface of said at least one veneer in an amount of 40 g/m2 to 80 g/m2.

15. The method of claim 12, further comprising at least one of: trimming the flooring plank; cutting the flooring plank; profiling the flooring plank; sanding the flooring plank.

* * * * *